United States Patent [19]
DeWulf

[11] Patent Number: 5,883,597
[45] Date of Patent: Mar. 16, 1999

[54] FREQUENCY TRANSLATION METHOD AND CIRCUIT FOR USE IN GPS ANTENNA ELECTRONICS

[75] Inventor: Thomas V. DeWulf, Cedar Rapids, Iowa

[73] Assignee: Rockwell International, Costa Mesa, Calif.

[21] Appl. No.: 971,614

[22] Filed: Nov. 17, 1997

[51] Int. Cl.[6] .............................. G01S 5/02; H04B 15/00
[52] U.S. Cl. ........................................... 342/357; 375/200
[58] Field of Search ........................... 342/357; 701/213; 375/200, 206

[56] References Cited

U.S. PATENT DOCUMENTS

| | | | |
|---|---|---|---|
| 5,036,330 | 7/1991 | Imae et al. | 342/357 |
| 5,101,416 | 3/1992 | Fenton et al. | 342/357 |
| 5,245,628 | 9/1993 | LaPadula, III et al. | 342/357 |
| 5,293,270 | 3/1994 | Lorenz et al. | 342/357 |
| 5,678,169 | 10/1997 | Turney | 342/357 |
| 5,736,961 | 4/1998 | Fenton et al. | 342/357 |

Primary Examiner—Gregory C. Issing
Attorney, Agent, or Firm—Kyle Eppele; James P. O'Shaughnessy

[57] ABSTRACT

Provided are a method of and a circuit for processing GPS signals in the L1 frequency band centered around frequency $f_{L1}$ and GPS signals in the L2 frequency band centered around frequency $f_{L2}$. The L1 frequency band signals are combined with the L2 frequency band signals to obtain a combined signal having both an L1 frequency band component and an L2 frequency band component. The combined signal is frequency converted by mixing it with a local oscillator signal centered around a frequency $f_{LO}$ to obtain a frequency converted combined signal centered around a third center frequency $f_{C3}$. The frequency converted combined signal is filtered to provide an output signal having substantially all of its components centered around the third center frequency $f_{C3}$. The frequency $f_{LO}$ of the local oscillator signal is selectively controlled to thereby control whether the output signal contains frequency components corresponding to only the L1 frequency band signal, to only the L2 frequency band signal, or to both of the L1 and L2 frequency band signals.

19 Claims, 2 Drawing Sheets

410 — Combine the signals in the L1 frequency band with the signals in the L2 frequency band to obtain a combined signal having both an L1 frequency band component centered around first center frequency $f_{L1}$ and an L2 frequency band component centered around a second center frequency $f_{L2}$.

420 — Provide a local oscillator signal centered around a local oscillator frequency $f_{LO}$.

430 — Frequency convert the combined signal by mixing the combined signal with the local oscillator signal to obtain a frequency converted combined signal having a component centered around a third center frequency $f_{C3}$.

440 — Filtering the frequency converted combined signal to provide an output signal having substantially all of its components centered around the third center frequency $f_{C3}$.

450 — Selectively control the frequency $f_{LO}$ of the local oscillator signal to thereby control whether the output signal contains frequency components corresponding to only the L1 frequency band signal, to only the L2 frequency band signal, or to both of the L1 and L2 frequency band signals.

5,883,597

FREQUENCY TRANSLATION METHOD AND CIRCUIT FOR USE IN GPS ANTENNA ELECTRONICS

FIELD OF THE INVENTION

The present invention relates generally to electronics for the global positioning system (GPS) or other global navigational satellite systems (GNSS). More particularly, the present invention relates to a frequency translation method and circuit for use in GPS or GNSS antenna electronics.

BACKGROUND OF THE INVENTION

The GPS, or other GNSS, can be used to determine the position of a user on or near the earth from signals received from multiple orbiting satellites. The latitude, longitude, and altitude of any point close to the earth can be calculated from the times of propagation of the electromagnetic signals from four or more satellites to the unknown location of a GPS or GNSS receiver. In the GPS satellite constellation, each satellite transmits two spread-spectrum signals in the L-band, known as L1 and L2. The L1 signal is transmitted at a center frequency of 1575.42 MHz, while the L2 signal is transmitted at a center frequency of 1227.6 MHz.

Typically, in the GPS, active antenna electronics adjust the gain and the phase of a multi-element antenna array in order to steer the antenna pattern away from an interference source which may serve to jam the satellite ranging signals. In order to adjust the gain and phase, power detection circuitry is used to detect the power in the L1 and L2 bands. With the power detection circuitry, the in-band power can be reduced by changing the gain and phase of the multi-element antenna array. If the GPS receiver is adapted to utilize only one of the L1 and L2 frequency band signals, it would be necessary to detect the power in only that corresponding one of the L1 and L2 frequency bands. However, if the GPS receiver utilizes both of the L1 and L2 frequency band signals in generating a navigation solution, it is desirable to detect and reduce the power in both bands simultaneously.

The number of components necessary to perform power detection in both the L1 frequency band and the L2 frequency band is significantly greater than the number of components typically needed to detect power in only one of these two frequency bands. In the prior art, two separate RF paths are used in the power detection circuitry, one to detect L1 frequency band signals and one to detect L2 frequency band signals. In addition to requiring two separate RF paths and significantly more circuitry, switching between power detection only in the L1 frequency band, power detection only in the L2 frequency band, and power detection in both the L1 and L2 bands simultaneously potentially adds a great deal of complexity to the circuitry.

SUMMARY OF THE INVENTION

Provided are a method of and a circuit for processing GPS signals in the L1 frequency band centered around frequency $f_{L1}$ and GPS signals in the L2 frequency band centered around frequency $f_{L2}$. The L1 frequency band signals are combined with the L2 frequency band signals to obtain a combined signal having both an L1 frequency band component and an L2 frequency band component. The combined signal is frequency converted by mixing it with a local oscillator signal centered around a frequency $f_{LO}$ to obtain a frequency converted combined signal having a component centered around a third center frequency $f_{C3}$. The frequency converted combined signal is filtered to provide an output signal having substantially all of its components centered around the third center frequency $f_{C3}$. The frequency $f_{LO}$ of the local oscillator signal is selectively controlled to thereby control whether the output signal contains frequency components corresponding to only the L1 frequency band signal, to only the L2 frequency band signal, or to both of the L1 and L2 frequency band signals.

BRIEF DESCRIPTION OF THE DRAWINGS

FIG. 2 is a flow diagram illustrating a preferred GPS antenna electronics frequency translation method in accordance with the present invention.

DETAILED DESCRIPTION OF THE PREFERRED EMBODIMENTS

Figure 1:
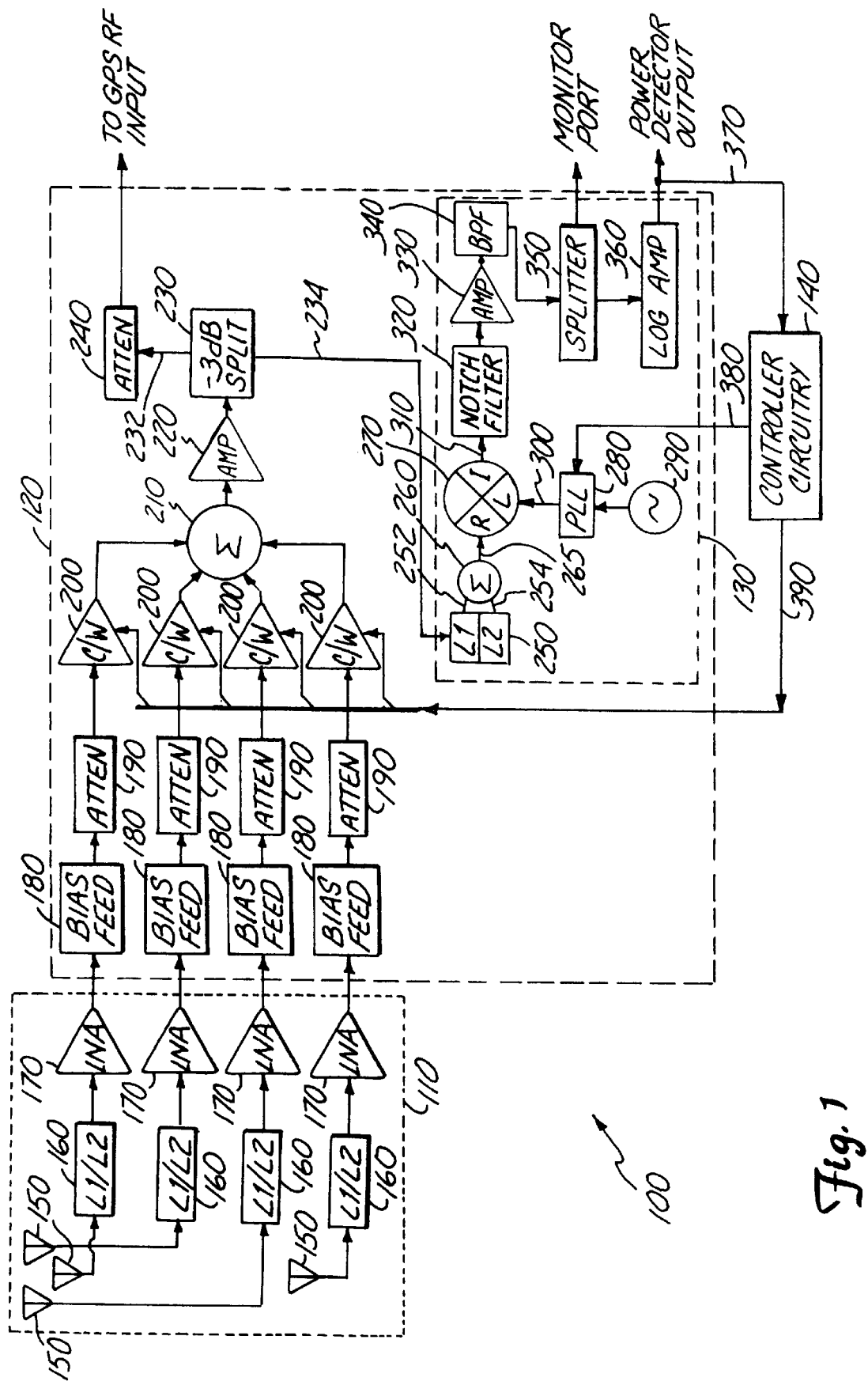
FIG. 1 is a schematic block diagram illustrating GPS signal processing circuitry in accordance with preferred embodiments of the present invention.

FIG. 1 is a schematic block diagram of portions of GPS or GNSS receiver 100 which includes circuitry 130, according to the present invention, for simultaneously processing signals in the L1 and L2 frequency bands. Circuitry 130 can be used, for example, to aid in power detection and reduction in the L1 and/or L2 frequency bands.

As illustrated in FIG. 1, GPS receiver 100 includes antenna array 110, RF board 120 which includes signal processing circuitry 130, and controller 140. As will be discussed below in greater detail after an introductory discussion of various illustrated components of GPS receiver 100, circuitry 130 can be used to process or monitor signals in the L1 frequency band, in the L2 frequency band, or in both the L1 and L2 frequency bands simultaneously. According to the present invention, circuitry 130 is controllable in order to select which of the three combinations of L1 and L2 frequency band signals are monitored.

Antenna array 110 includes four antenna elements 150, four band pass filters (BPFs) 160, and four low noise amplifiers 170. Antenna elements 150 receive GPS ranging signals in the L1 and L2 frequency bands. The L1 band signals have a center frequency $f_{L1}$, while the L2 band signals have a center frequency of $f_{L2}$. BPFs 160 receive the GPS ranging signals and filter out frequencies outside of the L1 and L2 frequency bands. Amplifiers 170 increase the amplitude of the filtered L1 and L2 frequency band ranging signals. The amplified ranging signals are provided to RF board 120.

RF board 120 includes bias feed devices 180, attenuaters 190, complex weight chips 200, summation circuitry 210, amplifier 220, splitter 230, attenuater 240, and circuitry 130.

Bias feed devices 180 are of the type which receive the amplified L1 band and L2 band ranging signals from amplifiers 170, and pass power back to low noise amplifiers 170 in order to power the low noise amplifiers. Typically, bias feed devices 180 provide the power for operation of low noise amplifiers 170 by placing DC bias on the RF cable which powers the low noise amplifiers.

Attenuaters 190 attenuate the signal level of the L1 band and L2 band satellite ranging signals. The attenuated L1 band and L2 band satellite ranging signals are then provided to complex weight chip 200 which controls the gain and phase of signals from each antenna independently. As controlled by control signal 390 generated by controller circuitry 140, the gain and phase of the signals from each antenna are manipulated in order to steer the antenna pattern. Since typical complex weight chips do not include a microprocessor interface, controller circuitry 140 will preferably include an analog voltage interface device, such as digital-to-analog (D/A) converter, to interface with complex weight chip 200 in order to control the gain of the signals.

After gain control by complex weight chip 200, the L1 band and L2 band signals from the four antenna elements are summed together by summation or combination circuitry 210. After summation by circuitry 210, amplifier 220 amplifies the combined signal and splitter circuitry 230 provides the combined signals at two separate outputs 232 and 234. At output 232, the combined signals are attenuated by attenuation circuitry 240 and provided to the RF input of the GPS receiver 100. At output 234 of splitter 230, the combined signals are provided to circuitry 130 for power detection or other processing.

Circuitry 130 includes ceramic diplexer 250, summation or combination circuitry 260, mixer 270, phase locked loop (PLL) 280, oscillator 290, notch filter 320, amplifier 330, BPF 340, splitter 350 and logarithmic amplifier 360. The combined signal containing the L1 and L2 frequency band signals is received and filtered by ceramic diplexer 250. Ceramic diplexer 250 is a filter, of the type well known in the art, which passes two distinct frequency bands at two separate diplexer outputs, and which attenuates or rejects signals at all other frequencies. Diplexer 250 is adapted to pass the L1 frequency band component of the combined signal at output 252, and to pass the L2 frequency band component of the combined signal at output 254. After filtering and separation into two distinct signals by diplexer 250, the L1 frequency band signals at output 252 and the L2 frequency band signals at output 254 are once again summed or combined by summation circuitry 260. Output 265 of summation circuitry 260 is a combined signal having only L1 frequency band components centered around frequency $f_{L1}$ and L2 frequency band components centered around frequency $f_{L2}$.

Oscillator 290 provides an oscillator signal at a constant known frequency. In one particular embodiment, oscillator 290 provides as an input to PLL 280 a 10.95 MHz signal. Oscillator 290 and PLL 280 together can be referred as a local oscillator or a synthesizer. PLL 280 uses the constant frequency signal from oscillator 290 to provide a synthesizer or local oscillator output signal at output 300. As is discussed below in greater detail, controller 140 generates a control signal 380 in order to selectively control the multiplier ratio implemented by PLL 280. This in turn controls the frequency $f_{LO}$ of local oscillator signal 300. Preferably, the frequency $f_{LO}$ is controlled to be one of three predetermined discrete frequencies.

With the L1 frequency band components of the combined signal provided at output 265 being centered about first center frequency $f_{L1}$, and with the L2 frequency band components being centered about second center frequency $f_{L2}$, the frequency $f_{LO}$ of the local oscillator signal can be selected in order to frequency convert either of the L1 and L2 frequency band components into a third frequency band, or to simultaneously frequency convert both of the L1 and L2 frequency band components into the third frequency band. Input R of mixer 270 is an RF input coupled to output 265 of summation circuitry 260. Input L of mixer 270 is a local oscillator input coupled to output 300 of the PLL 280. Output I of mixer 270 provides the frequency converted version of the signal provided at input R, which has a frequency band component centered around a third center frequency $f_{C3}$. Generally, as is known in the art, mixers shift the frequency of the RF input signal either up or down by the frequency $f_{LO}$ of the local oscillator signal.

In preferred embodiments of the present invention, the center frequency $f_{C3}$ of mixer 270 is equal to 0.5 $(f_{L1}-f_{L2})$. In order to frequency convert the combined L1 and L2 frequency band signal provided at input R of mixer 270 into a signal having desired components centered about third center frequency $f_{C3}$, the frequency $f_{LO}$ of the local oscillator signal provided to mixer 270 can be selectively controlled to be equal to one of three values. First, if it is desired to pass only the components of the combined signal corresponding to the L1 frequency band, then frequency $f_{LO}$ can be set equal to $f_{L1}+f_{C3}$. Second, if it is desired to pass only the L2 frequency band components of the combined signal, then controller circuitry 140 controls PLL 280 such that frequency $f_{LO}$ is equal to $f_{L2}-f_{C3}$. Finally, if it is desired to pass both the L1 frequency band components and the L2 frequency band components of the combined signal to the frequency band surrounding center frequency $f_{C3}$, then local oscillator frequency $f_{LO}$ is controlled to be equal to $f_{L1}-f_{C3}$ (=$f_{L2}+f_{C3}$).

For example, with the center frequency $f_{L1}$ of the L1 frequency band component equal to about 1575.42 MHz, and the center frequency of the L2 frequency band component equal to about 1227.6 MHz, third center frequency $f_{C3}$ would be equal to about 173.91 MHz. If it is desired to convert only the L1 frequency band components of the combined signal to the frequency band centered about 173.19 MHz, controller circuitry 140 is used to control PLL 280 in order to produce a local oscillator signal having frequency $f_{LO}$ of about 1749.3 MHz. If it is desired that only the L2 frequency band components of the combined signal be frequency converted to the frequency band having a center frequency of 173.91 MHz, then controller circuitry 140 controls PLL 280 to produce a local oscillator signal having frequency $f_{LO}$ of about 1053.7 MHz. If it is desired that both the L1 frequency band components and the L2 frequency band components of the combined signal be frequency converted into the same frequency band centered about 173.91 MHz, then controller circuitry 140 controls PLL 280 to produce a local oscillator signal having a frequency $f_{LO}$ of about 1401.5 MHz.

The frequency converted signal provided at output 310 of mixer 270 is filtered by notch filter 320 to eliminate frequency components in the signal which correspond to a frequency band other than the frequency band surrounding third center frequency $f_{C3}$. For example, if the local oscillator frequency $f_{LO}$ is controlled to be 173.91 MHz above center frequency $f_{L1}$, or to be 173.91 MHz below center frequency $f_{L2}$, a frequency component in the signal provided at mixer output 310 will be centered around 521 MHz. The frequency component centered around 521 MHz will correspond to the non-selected L1 or L2 frequency band signal. Notch filter 320 rejects this frequency converted L1 or L2 component. Generally, the notch of notch filter 320 is centered about a frequency which is substantially $3f_{C3}$.

In some preferred embodiments, the signal provided as an output by notch filter 320 is amplified by amplifier 330 in order to increase the signal strength. PPF 340 preferably has about a 6 MHz band width centered around frequency $f_{C3}$. However, the band width of BPF 340 can be designed to be any of a wide variety of different band widths for specific applications. Depending upon how PLL 280 of the synthesizer is controlled, either the frequency converted L1 band information, the frequency converted L2 band information, or frequency converted information from both the L1 and L2 bands will be allowed to pass through BPF 340.

Splitter 350 splits the signal, providing the signal to a monitor port and to logarithmic amplifier 360. Logarithmic amplifier 360 generates a power detector output signal which can be provided to controller circuitry 140. Controller circuitry 140 uses the information from the power detector output to control the gain of complex weight chips 200. As discussed above, controller circuitry 140 also produces control signal 380 which controls PLL 280 in order to select one of the three above-described local oscillator frequencies. The power detector output is an indication of the in-band power in the L1 and L2 frequency bands. Based upon the power detector output, the gain and phase of the complex weight chips can be controlled to minimize the in-band power.

FIG. 2 is a flow diagram 400 illustrating the above discussed method of frequency translation for use in GPS or in GNSS receiver electronics. Although discussed above in greater detail, one embodiment of the method of the present invention can be summarized as follows. First, at step 410, the signals in the L1 frequency band are combined with the signals in the L2 frequency band to obtain a combined signal having both an L1 frequency band component centered around center frequency $f_{L1}$ and an L2 frequency band component centered around center frequency $f_{L2}$.

At step 420, a local oscillator signal centered around a local oscillator frequency $f_{LO}$ is provided. At step 430, the combined signal is frequency converted by mixing it with the local oscillator signal to obtain a frequency converted combined signal having a component centered around a third center frequency $f_{C3}$. Next, at step 440, the frequency converted combined signal can be filtered to provide an output signal having substantially all of its components centered around the third center frequency $f_{C3}$. Finally, at step 450, the frequency $f_{LO}$ of the local oscillator signal is selectively controlled to thereby control whether the output signal contains frequency components corresponding to only the L1 frequency band signal, to only the L2 frequency band signal, or to both of the L1 and L2 frequency band signals.

Switching the local oscillator frequency in the manner provided above renders the present invention a highly configurable circuit which can be adapted to function with an L1 frequency band GPS receiver, with an L2 frequency band GPS receiver, or with a combined L1 and L2 frequency band GPS receiver. Converting both the L1 band and the L2 band into a single lower frequency band allows the elimination of circuitry and lends the present invention to use as a low cost dual band power detector.

Although the present invention has been described with reference to preferred embodiments, workers skilled in the art will recognize that changes may be made in form and detail without departing from the spirit and scope of the invention.

What is claimed is:

1. A method of simultaneously processing global positioning system (GPS) signals in the L1 and L2 frequency bands, the GPS signals in the L1 band being centered around a first center frequency $f_{L1}$ and the GPS signals in the L2 frequency band being centered around a second center frequency $f_{L2}$, the method comprising:

summing the signals in the L1 frequency band with the signals in the L2 frequency band to obtain a summed signal having both an L1 frequency band component and an L2 frequency band component;

providing a local oscillator signal centered around a local oscillator frequency $f_{LO}$;

frequency converting the summed signal by mixing the summed signal with the local oscillator signal to obtain a frequency converted summed signal centered around a third center frequency $f_{C3}$;

filtering the frequency converted summed signal to provide an output signal having substantially all of its components centered around the third center frequency $f_{C3}$; and selectively controlling the frequency $f_{LO}$ of the local oscillator signal to thereby control whether the output signal contains frequency components corresponding to only the L1 frequency band signal, to only the L2 frequency band signal, or to both of the L1 and L2 frequency band signals.

2. The method of claim 1, wherein the step of selectively controlling the frequency of the local oscillator signal further comprises controlling the frequency $f_{LO}$ to be equal to $f_{L1}+f_{C3}$ if the output signal is to contain frequency components corresponding to only the L1 frequency band signal, controlling the frequency $f_{LO}$ to be equal to $f_{L1}-f_{C3}$ if the output signal is to contain frequency components corresponding to both of the L1 and L2 frequency band signals, and to be equal to $f_{L2}-f_{C3}$ if the output signal is to contain frequency components corresponding to only the L2 frequency band signal.

3. The method of claim 2, wherein the step of filtering the frequency converted summed signal to provide the output signal having substantially all of its components centered around the third center frequency $f_{C3}$ further comprises filtering the frequency converted summed signal to provide the output signal such that the output signal is centered around the third center frequency $f_{C3}$, wherein $f_{C3}=0.5(f_{L1}-f_{L2})$.

4. The method of claim 3, wherein the step of filtering the frequency converted summed signal further comprises filtering the frequency converted summed signal such that it lies within a predetermined bandwidth.

5. The method of claim 4, wherein the predetermined bandwidth is equal to approximately 6 MHz.

6. The method of claim 3, wherein the third center frequency $f_{C3}$ is approximately 174 MHz.

7. The method of claim 3, wherein before the step of summing the signals in the L1 frequency band with the signals in the L2 frequency band to obtain the summed signal having both the L1 frequency band component and the L2 frequency band component, the method further includes:

combining the signals in the L1 frequency band with the signals in the L2 frequency band to obtain a combined signal;

filtering the combined signal with a ceramic diplexer to filter out frequency components outside of desired portions of the L1 and L2 frequency bands, the ceramic diplexer providing as an output a filtered L1 frequency band signal and a filtered L2 frequency band signal.

8. An apparatus for simultaneously processing global positioning system (GPS) signals in the L1 and L2 frequency bands, the GPS signals in the L1 band being centered around a first center frequency $f_{L1}$ and the GPS signals in the L2 frequency band being centered around a second center frequency $f_{L2}$, the apparatus comprising:

combining means for combining the signals in the L1 frequency band with the signals in the L2 frequency band to obtain a combined signal having both an L1 frequency band component and an L2 frequency band component;

synthesizer means for providing a local oscillator signal centered around a local oscillator frequency $f_{LO}$;

frequency conversion means coupled to the combining means and the synthesizer means for frequency converting the combined signal by mixing the combined signal with the local oscillator signal to obtain a frequency converted combined signal having a component centered around a third center frequency $f_{C3}$;

filter means coupled to the frequency conversion means for filtering the frequency converted combined signal to provide an output signal having substantially all of its components centered around the third center frequency $f_{C3}$; and synthesizer control means for selectively controlling the frequency $f_{LO}$ of the local oscillator signal to thereby control whether the output signal contains frequency components corresponding to only the L1 frequency band signal, to only the L2 frequency band signal, or to both of the L1 and L2 frequency band signals.

9. The apparatus of claim 8, wherein the synthesizer control means controls the frequency $f_{LO}$ to be equal to $f_{L1}+f_{C3}$ if the output signal is to contain frequency components corresponding only to the L1 frequency band signal, controls the frequency $f_{LO}$ to be equal to $f_{L1}-f_{C3}$ if the output signal is to contain frequency components corresponding to both of the L1 and L2 frequency band signals, and controls the frequency $f_{LO}$ to be equal to $f_{L2}-f_{C3}$ if the output signal is to contain frequency components corresponding only to the L2 frequency band signal.

10. The apparatus of claim 9, wherein the filter means passes a portion of the combined signal having a predetermined bandwidth surrounding $f_{C3}$, wherein $f_{C3}$ is approximately equal to $0.5(f_{L1}-f_{L2})$.

11. The apparatus of claim 10, wherein the predetermined bandwidth is equal to approximately 6 MHz.

12. The apparatus of claim 10, wherein the third center frequency $f_{C3}$ is approximately 174 MHz.

13. The apparatus of claim 10, and further comprising:

summing means for summing the signals in the L1 frequency band with the signals in the L2 frequency band to obtain a summed signal;

diplexer filter means for receiving and filtering the summed signal, the diplexer filter means providing as an output for use by the combining means the GPS signals in the L1 frequency band and the GPS signals in the L2 frequency band.

14. A circuit for simultaneously processing global navigational satellite system (GNSS) signals in the L1 and L2 frequency bands, the GNSS signals in the L1 frequency band being centered around a first center frequency $f_{L1}$ and the GNSS signals in the L2 frequency band being centered around a second center frequency $f_{L2}$, the circuit comprising:

a first summing device receiving a first signal in the L1 frequency band centered around first center frequency $f_{L1}$ and a second signal in the L2 frequency band centered around second center frequency $f_{L2}$, the first summing device summing the first and second signals to obtain a combined signal having both an L1 frequency band component centered around first center frequency $f_{L1}$ and an L2 frequency band component centered around second center frequency $f_{L2}$;

a synthesizer providing a local oscillator signal centered around a local oscillator frequency $f_{LO}$;

a mixer coupled to the first summing device and to the synthesizer, the mixer frequency converting the combined signal by mixing the combined signal with the local oscillator signal to obtain a frequency converted combined signal having a component centered around a third center frequency $f_{C3}$; and a synthesizer controller coupled to the synthesizer to selectively control the frequency $f_{LO}$ of the local oscillator signal to thereby control whether the component of the frequency converted combined signal centered around the third center frequency $f_{C3}$ contains frequency components corresponding to only the first signal, to only the second signal, or to both of the first and second signals.

15. The circuit of claim 14, and further comprising a filter coupled to the mixer and filtering the frequency converted combined signal to provide an output signal having substantially all of its components centered around the third center frequency $f_{C3}$.

16. The circuit of claim 15, wherein the synthesizer controller controls the frequency $f_{LO}$ to be equal to $f_{L1}+f_{C3}$ if the output signal is to contain frequency components corresponding only to the first signal, controls the frequency $f_{LO}$ to be equal to $f_{L1}-f_{C3}$ if the output signal is to contain frequency components corresponding to both of the first and second signals, and controls the frequency $f_{LO}$ to be equal to $f_{L2}-f_{C3}$ if the output signal is to contain frequency components corresponding only to the second signal.

17. The circuit of claim 16, wherein the filter passes a portion of the frequency converted combined signal having a predetermined bandwidth surrounding $f_{C3}$, wherein $f_{C3}$ is approximately equal to $0.5(f_{L1}-f_{L2})$.

18. The circuit of claim 17, wherein the predetermined bandwidth is equal to approximately 6 MHz.

19. The circuit of claim 18, wherein the third center frequency $f_{C3}$ is approximately 174 MHz.

* * * * *